No. 616,153. Patented Dec. 20, 1898.
E. A. SPERRY.
MOTOR VEHICLE.
(Application filed Feb. 18, 1896.)
(No Model.) 4 Sheets—Sheet 1.
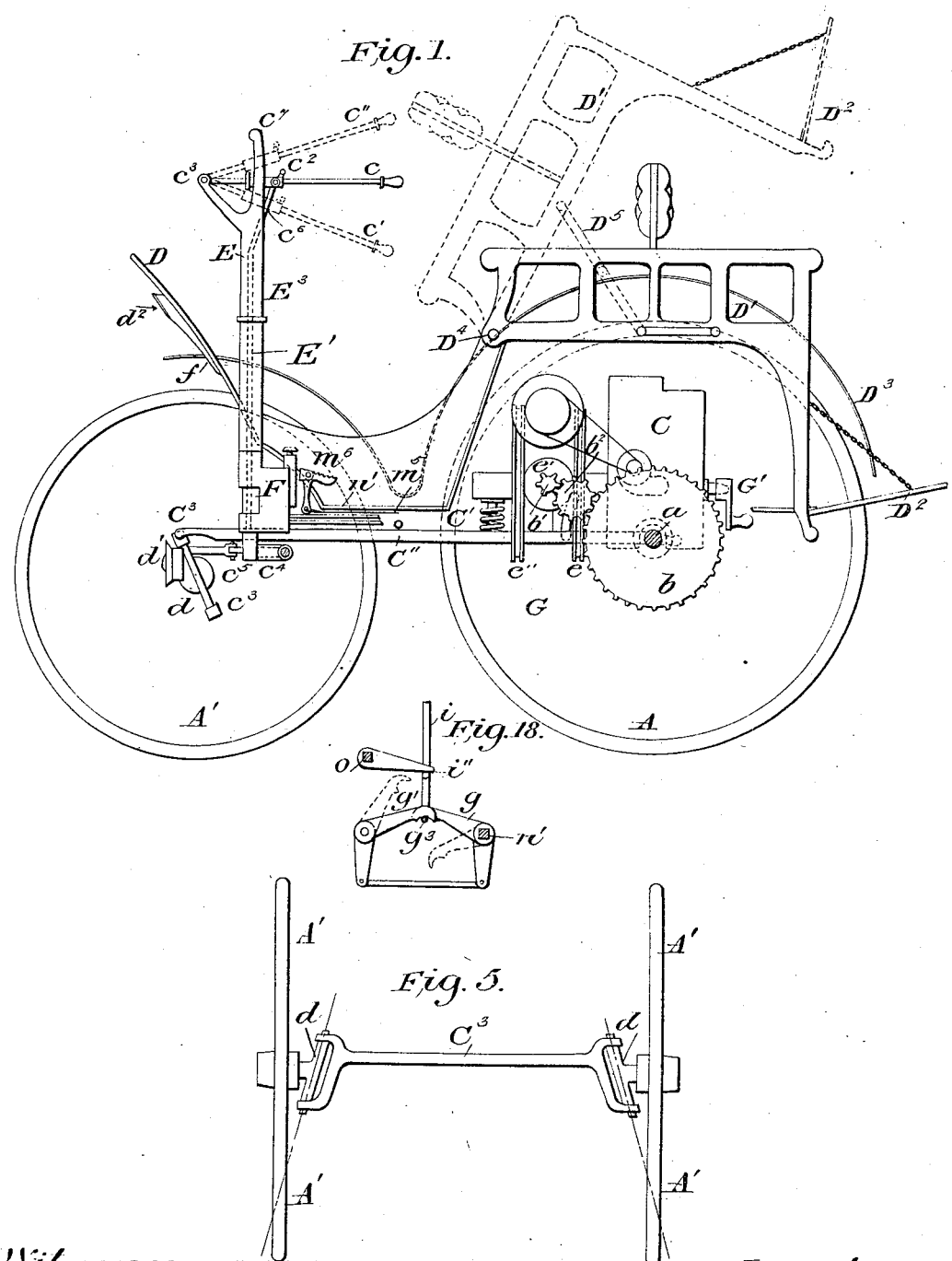

No. 616,153.　　　　　　　　　　　　　　　　　　　Patented Dec. 20, 1898.
E. A. SPERRY.
MOTOR VEHICLE.
(Application filed Feb. 18, 1896.)
(No Model.)　　　　　　　　　　　　　　　　　　　　4 Sheets—Sheet 2.
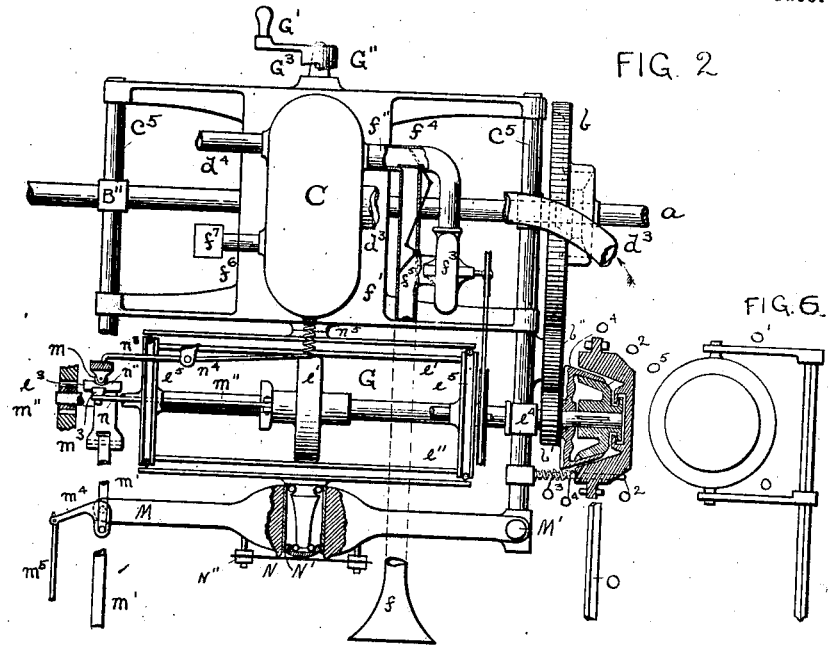
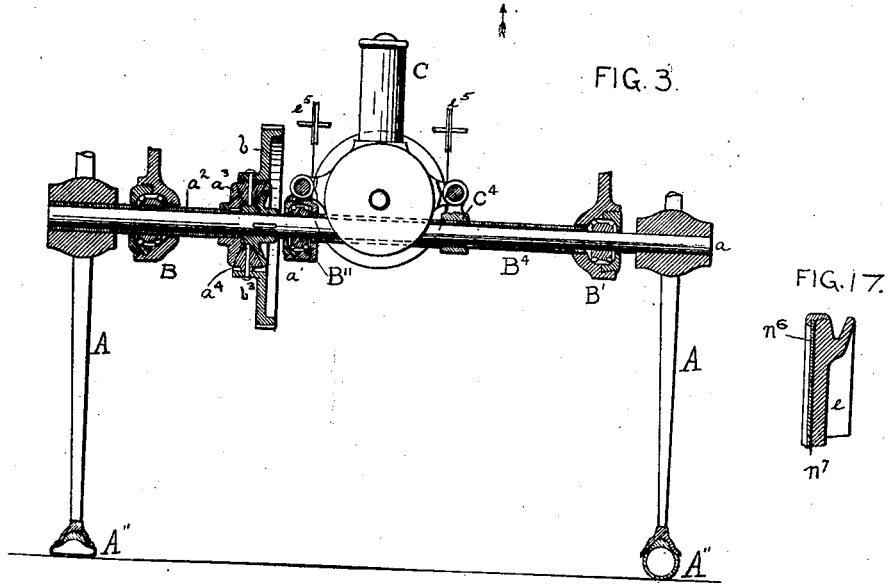
WITNESSES
INVENTOR
Elmer A. Sperry No. 616,153. Patented Dec. 20, 1898.
E. A. SPERRY.
MOTOR VEHICLE.
(Application filed Feb. 18, 1896.)
(No Model.) 4 Sheets—Sheet 3.

WITNESSES

INVENTOR
Elmer A. Sperry.

No. 616,153. Patented Dec. 20, 1898.
E. A. SPERRY.
MOTOR VEHICLE.
(Application filed Feb. 18, 1896.)
(No Model.) 4 Sheets—Sheet 4.

WITNESSES
I. E. Kritch
F. C. Toedtmann

INVENTOR
Elmer A. Sperry

UNITED STATES PATENT OFFICE.

ELMER A. SPERRY, OF CLEVELAND, OHIO.

MOTOR-VEHICLE.

SPECIFICATION forming part of Letters Patent No. 616,153, dated December 20, 1898.

Application filed February 18, 1896. Serial No. 579,794. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Vehicle-Powers, of which the following is a specification.

My invention relates to vehicle-powers; and it consists in a new and novel method of supplying air to the motor when a heat-motor is employed; a system of control for the vehicle; also, special gearing between the motor and the vehicle-wheels; means for varying the speed and disconnecting such wheels from the motor, and means for braking the vehicle as a whole and for the support of the motor with reference to the other parts of the vehicle connections between a special character of vehicle-wheel and motors.

My present invention also illustrates a special carriage frame or body affording access to the motor parts; also, controller mechanism and interlocking devices, all of which are described in the following specification and particularly pointed out in the claims, and shown embodied in one form in the accompanying drawings, in which—

Figure 4:
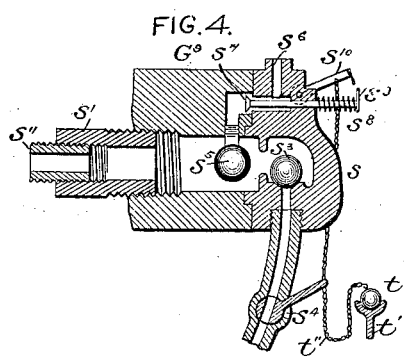

Figure 1 is a longitudinal section of the parts, in elevation, of the vehicle, showing an outline of the general arrangement. Fig. 2 is a plan view of the general arrangement of the motor parts. Fig. 3 is a vertical section through portions of same. Fig. 4 is a view, partially in section, of a form of the automatic cut-off device. Fig. 5 is a detail of the vehicle. Fig. 6 is a detail of the brake. Figs. 7, 8, 9, 10, 11, 12, 13, 14, 15, 16, and 17 are details of the gearing. Figs. 18, 19, 20, and 21 are details of the controller mechanism.

Similar letters of reference indicate like parts throughout the several views.

The vehicle is constructed with drive-wheels A and the guiding-wheels A', the former being fitted, preferably, with an expansible tire A" or other means for varying their working diameter. These wheels are in turn coupled for independence of movement and are driven respectively by axle $a$, connected to gear $a'$, sleeve or axle $a^2$, secured to the other wheel A and connected with gear $a^3$. The two gears are in turn driven by a pinion or pinions $a^4$, actuated by a rotating element or gear $b$. The axle A supports three journals, shown in the form of ball-bearings B B' B". The motor C rests suitably upon this axle and receives an additional support, clearly to be seen in Fig. 1, constituting the resilient element C' and serving to prevent the motor from swinging around the axle $a$ by attaching to a part C", resting suitably upon the forward axle $C^3$ or wheels A'. The support upon the rear axle is seen in Fig. 3 to consist in a direct bearing of one side of the motor C upon bearing B' and the other side of the motor at $C^4$ upon some suitable connecting device between the journals B' and B". The natural support of this motor would be a fourth journal at this point; but it will be seen that the connection $B^4$, constituting in this instance the stationary sleeve encircling but not touching the axle $a$, obviates the necessity of an additional journal and cheapens and lightens the structure. It will at once be seen that this system of mounting is not limited in its application to any particular form of motor.

In Figs. 2 and 3 are seen side bars $C^5 C^5$, which preferably consist in tubes serving to connect the motor C with the gearing G, by means of which the driven element $b$ derives its motion from the motor. The carriage or vehicle is provided with a dasher D and seat or seats D' D', and may also have the folded foot-rest $D^2$ and the other ordinary and usual appendages, such as mud guards or fenders $D^3$. The portions covering the motor C or power-producing agent, however, are preferably so supported as to fold back or rise up in such a manner as to give free access to the motor. In the present design I accomplish this by swinging the parts about the pivot $D^4$, providing a suitable rest, such as $D^5$, for retaining the parts in the raised or folded position. (See Fig. 1.) Fig. 1 also indicates the controlling device E, consisting of the handle $c$, shown in full lines at its middle position of rest and in dotted lines (indicated at $c'$) in its lower position and at $c''$ in its higher or raised position. The handle is removable in any suitable manner—for instance, by loosening the pinch-bolt or other fastening $c^2$. The upright bar, upon which the handle is pivoted at point $c^3$, swivels, being suitably guided, for instance, within the tube E', and its bottom is connected by a link $c^4$ to the cross-bar $c^5$, serving to guide the wheel or wheels A'. This handle serves to vary the speed of the wheel and to stop and start. These objects are accomplished in one form, as follows: A rod $c^6$ connects with the handle $c$ and extends downwardly to the controller-box F. (Shown more clearly in Figs. 18 to 21.) The axle $C^3$ (see Figs. 1 and 5) is forked at its ends, and the wheels A' are suitably pivoted at $d\ d$ within the fork and connected by the rod $c^5$, (see Fig. 1,) as is usual in vehicles of this class. The pivots, however, are in certain lines or angles, to which I wish to call special attention, which are clearly seen in the figures, and those in the transverse plane of the vehicle pass to a point beyond the wheel contact with the ground or ground-line, as seen by the projection of the dotted line in Fig. 5, and in longitudinal plane they are also at an oblique angle, as seen at $C^3\ C^3$ in Fig. 1. The former angle serves to give a stability to these wheels while moving over rough ground, and especially when encountering large objects, which, if of a character to seriously impede the progress of the wheels, would encounter the object proper at the point of intersection of the center of the wheel-rim, with the downwardly-projecting dotted line in the axis of the wheel-pivots $d\ d$. The longitudinal angle shown in Fig. 1 is useful in changing the level of the carriage or vehicle in turning curves and causes the vehicle to climb to the center of oval-surfaced road-beds, as will be readily understood. By this arrangement by turning, for instance, to the right the right side of the vehicle may be depressed and the left side simultaneously elevated, increasing materially the stability of the vehicle and the comfort of the passengers and especially in case the curve is made at a high rate of speed. The head-light $d'$ is shown attached to one or both of the pivots $d$, so that it will turn with the pivots or with the controller E or the connected parts, so as to cast a light in the direction in which it is desired to go before the vehicle as a whole has changed its direction rather than shining at all times in the line of the vehicle-body.

When the motor used in a vehicle employs air as a principal medium in developing its power, and as this air cannot be stored but must be collected from the dusty highway as the vehicle progresses, it becomes necessary to provide special means to obtain air as free as possible from dust and grit, which is found soon destroy and grind out the "working fits," packing, and joints of the motor. The vehicle-wheels raise this dust in abundance, and I have found that it is inadmissible to use the air from in under the vehicle, as is the usual practice. In screening the air for test I have found a marked difference in the amount of dust collected from air taken from in front of the vehicle when admitted at or near the top of the dasher and at the bottom or in under, the former containing only forty per cent. of the dust of the latter. I have therefore adopted the arrangement of air duct and pipes leading to the motor, as herein shown. Upon a forward part, such as the dasher, and preferably high up with reference to the vehicle, is provided an intake-duct $d^3$. The connection with the motor is broken for the sake of clearness in Fig. 1, but in Fig. 2 it is indicated again at $d^3\ d^3$. It is presumed that pure air may be obtained here rather than in the rear of or under the vehicle, where dust has risen from the moving of the wheels upon the roadway. This duct constitutes the intake of the motor.

An additional air-supply is shown as being connected with the motor (shown in Fig. 2) and consists in the bell-mouth $f$, connected with the tube $f'$, joining a tube $f'''$, both of which tubes join also a power-blower or equivalent pressure-producing or fluid-circulating device $f^2$. Suitable valves $f^4\ f^5$, either working independently or connectedly, as shown, are arranged to direct the influx of air at the bell-mouth to the motor C around through the power-blast, as shown in full lines, or directly to the motor, as shown in dotted lines, or they may be stationed at any intermediate position, or the device may cause the required circulation by exhaustion. The eduction of this air after passing the motor is indicated at $f^6$, and a receiver for the air, which has become heated in the motor C, is shown at $f^7$. It is obvious that the tube $f'$, leading either to the motor or the blower, may be dispensed with, or the shape of its ends may be varied and be of any form; but the arrangement indicated is preferred.

The gear or other rotating element $b$, operating the drive-wheels A A, is connected with the driving element or pinion $b'$ by an intermediate gear $b''$. The support of this gear is shown in Fig. 1 as being a slot concentric with the axle $a$ for permitting adjustment of the gear with reference to the pinion $b'$ or a pinion of different size.

Figure 13:
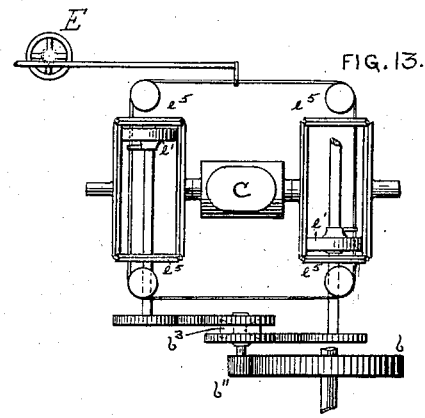
Figure 14:
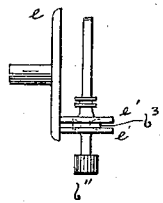
Figure 16:
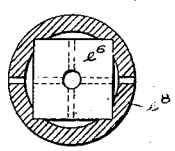
Figure 15:
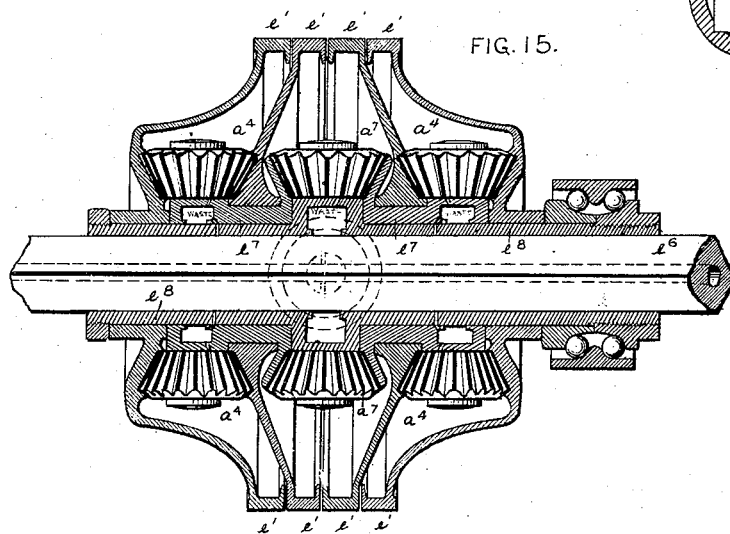

When some forms of motor are employed, it becomes desirable to employ a driving-gearing serving to connect the rotating element $b$ and the wheels A to the motor at various speeds and opposite directions, stop, start, and detach the same from the motor. One form of such gear will now be described, reference being had to the foregoing, together with Figs. 7 to 17, inclusive. This is shown to consist of a disk $e$ and a coöperating friction-wheel $e'$. The latter wheel may be duplicated, as shown in Fig. 14, and the disk may be also duplicated, another disk $e''$ being added, as shown in Figs. 1 and 2. This may be simply added as a pressure-disk to insure pressure between the wheel $e'$ and the disk $e$, or may itself be a driving element, as shown in Figs. 1, 2, 7, 8, 9, 10, 11, and 13. In case the second disk $e''$ is employed it is preferable that if more than one journal is employed for the wheel $e'$ one or both shall have capacity for lateral travel, so as to leave the wheel free to take up the desired position due to its compression between the disks. This is clearly shown in Fig. 2 at $e^3$, the lost motion being shown in one journal-box only. The additional journal $e^4$ is preferably mounted, so as to allow of the swing or travel of the journal $e^3$ through a sufficient space to satisfy all demands. The power may be supplied to the disk or disks $e''$ in any suitable manner—such, for instance, as by belts shown passing over grooved pulleys or idlers $e^5$, Figs. 2 and 3—and the power-blast $f^3$ is shown as receiving its power from one of such idlers in Fig. 2. Where more than one friction-wheel $e'$ is employed and their effort is desired to be utilized upon a single driven element, it is desirable to provide some form of differential gear or power-equalizing device between them to provide against any irregularity that may exist. This may be of any of the well-known forms; but I prefer for the sake of simplicity to indicate it by the usual form, including the bevel gear or gears and pinion or pinions $a'$, $a^3$, and $a^4$, which collectively I now indicate by letter $b^3$. (See Figs. 3, 9, 13, and 14.) The pinions $a^4$ may be clearly seen in Fig. 15. Here a group of four friction-wheels $e'$ are shown delivering their power to the shaft $e^6$, the wheels being grouped in two pairs of two each, one pair being either side of the center. These wheels are mounted loosely upon the journals and serve to deliver their power by means of the gears $a^4$ $a^4$ $a^4$ $a^4$ to the sleeves $e^7$, which in turn are mounted loosely upon the main sleeve $e^8$ $e^8$, and to which the power of the said two lesser sleeves $e^7$ $e^7$ is delivered by means of the small gears $a^7$ $a^7$. Thus it will be seen that each of the four friction-wheels $e'$ may travel at a different velocity or in different directions, and the differential action or the algebraic sum of their velocities is by the devices illustrated, consisting of the sleeves and pinions, transmitted to the axle or shaft $e^6$. An oiling system is clearly to be seen, consisting in the perforation of this shaft $e^6$, distributing oil to the cavities in the various sleeves. This is shown in section in Fig. 16, the sleeve $e^8$ fitting upon the square shaft $e^6$, and the oil passages and cavities are here shown. In Fig. 13 a differential arrangement $b^3$ is shown outside the friction-wheels $e'$ and after the power has been taken from these wheels and is about to be delivered to the pinion $b''$. This is also the case in Fig. 9. Here, however, the friction-wheels $e'$ are shown as revolving in opposite directions. It is desirable in all these devices that the movement or travel of the friction-wheels $e'$ with reference to the disk should be simultaneous. This is shown in Figs. 14 and 15 and in Fig. 13 by a different method, receiving actuation from the controller E. A ball-bearing for the support of the disk $e''$ and also for the support of its thrust-pressures is clearly shown in Fig. 2. In this figure also may be readily seen the pressure-relief devices for disconnecting the motor from the driven element automatically by the cam-wheel $m$, connecting as it does to the rod $m'$ and swinging the bar M about its pivot M' and when in the position shown in the drawings causing the spring N to thrust the loose bearing-sleeve N' inward with any amount of predetermined pressure, being adjustable by the nuts N'' or any equivalent device. The pivot M' may be adjustable or the link $m'$ may be adjustable with reference to the cam-roller $m$, so as to insure the requisite pressure between the disk and wheel. It will be seen that the link $m''$, serving to connect the friction-wheel with the lever $m^3$, effects a lateral travel of the wheel $e'$ upon its shaft as the part $n$ revolves by means of its shaft $n'$, broken away for the sake of clearness and extending to the controller, as may readily be seen at $n'$, Fig. 1, and also Figs. 18 to 21. The cam-slot $n''$, Fig. 2, is also connected with this rotating part $n$, so that the pressure or movement of the lever M is made to take place at some predetermined point or points in the travel of the wheels $e'$. A toggle-lever $m^4$ is also shown connected to the treadle $m^6$ by a rod $m^5$, (see Figs. 1 and 2,) by means of which such pressure and the disconnecting function may be performed at the will of the operator. An additional connection $o$ will be seen to exist between the controller and the power-controlling mechanism, constituting a brake-actuator. This may be of any suitable character—for instance, a rotary connection, as indicated in Figs. 2 and 18, or may be a pulling connection, (shown in Figs. 19 to 21,) in which case it may be converted into a rotary motion at the motor end and serve, by means of arms $o'$ $o'$, to operate the friction-brake block $o^2$ against the spring $o^3$, engaging the conical surface $o^4$. The brake-actuator $o$ may serve an additional purpose of power disconnection between the power-driven element, as $b$ or C, and the driving element or medium or between the former and motor C by the engagement on the interior surface of the cone $o^4$, which is connected with the pinion $b'$, mounted in this case loosely upon the shaft, the driving element of the coöperating cone $o'$, actuated by the brake-operating rod $o$, being feathered upon the shaft and free to move a short distance longitudinally thereon. The brake $o^2$, as will be seen, acts only indirectly on the vehicle-wheels, which are coupled for independence of rotation, and the wheels are also independent of the rotating part $b$, to which the brake action is directly transmitted.

A coöperating connection $n^3$, pivoted at $n^4$, is so connected with the parts moved by the controller or with the controller itself—in this instance with the cam-operated lever $m$, that it may affect the spring $n^5$ and in turn affect the motor. The spring $n^5$ is suitably connected to the motor-speed-regulating devices—in the present instance to a valve controlling the flow of a propelling medium to or from the motor or the flow of one or more of the constituent elements of such propelling medium—or other suitable device, sufficient in any case to control the action of the motor at predetermined points in the motion or control of the power-gearing by the controlling-handle. The friction-disks are preferably covered with a fibrous or friction surface $n^6$, which is secured suitably at or near its perimeter, (indicated at Fig. 1,) which also shows the underlying medium $n^7$, which is preferably elastic, so as to equalize the pressure on the wheel or wheels $e'$. In this figure are also shown the grooves in which the driving-belt may operate. It is evident that the elastic medium could be differently located and still perform its function, which would be fulfilled if the elastic medium were used itself as the friction medium and disposed upon either the disk or wheel, or both. In any case it should be located between the shaft of the wheel or wheels $e'$ and the disk.

With reference to the intake of the air, which is used in operating or aiding in the operation of any of the mechanisms or gearing of the vehicle, being located forward and high, as above stated, it will readily be seen that upon other shapes of these bodies—such, for instance, as an inclosed cab, car, or car-body—the dasher would not of necessity be used, and in this case the intake-pipe $d^3$ may run up even as high as the roof and there be provided with a suitable funnel or other mouth. The character of the body would obviously determine the position of the intake, and the invention extends to its use, as described.

Figure 19:
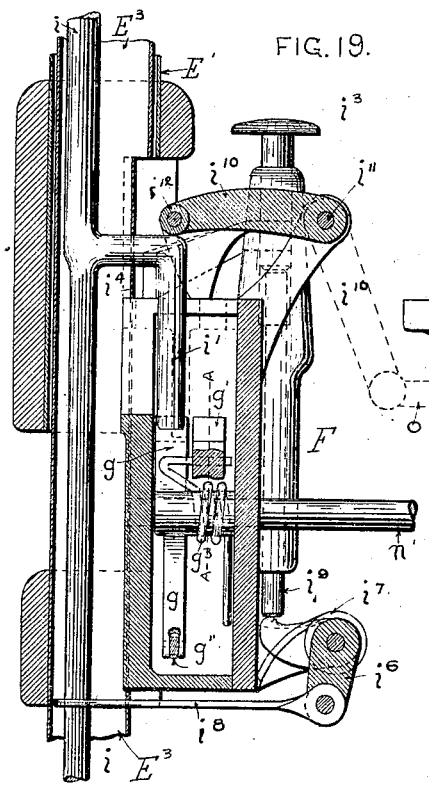
Figure 20:
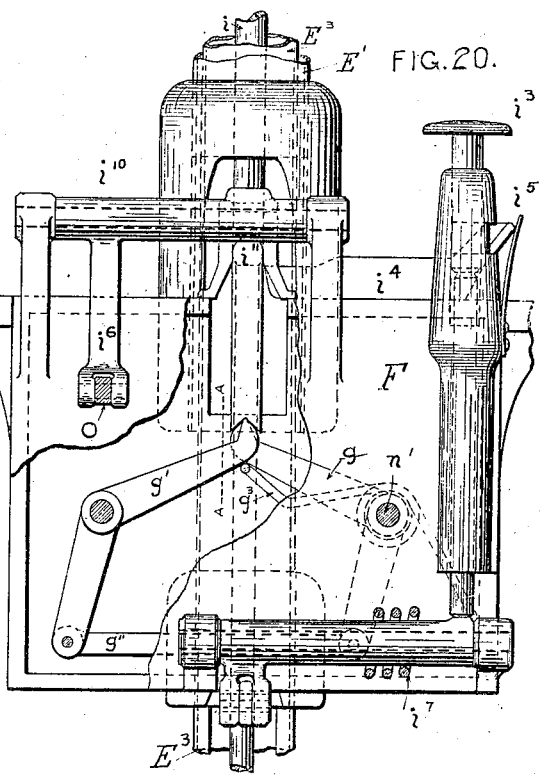
Figure 21:
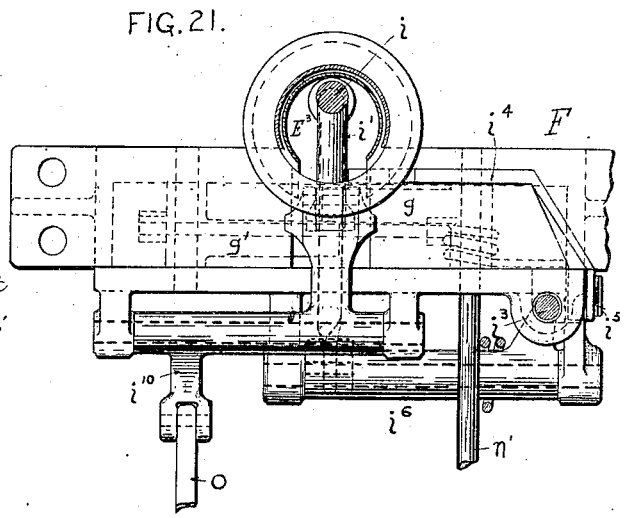
Figure 7:
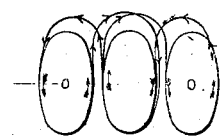
Figure 8:
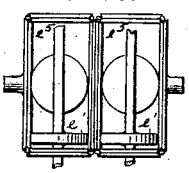
Figure 9:
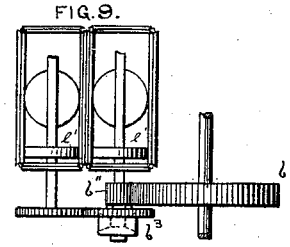
Figure 10:
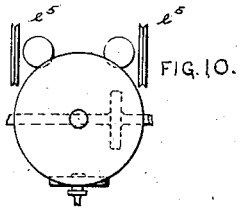
Figure 11:
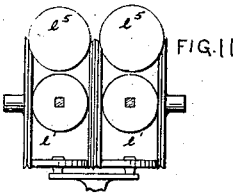
Figure 12:
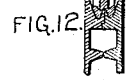

Passing now to the particular adaptation of the controller mechanism suited to the present speed-varying devices, by means of which the motor is connected to and disconnected from the driving-wheels and also by means of which the other several functions are performed, in the present instance we find that in diagram it is shown in Fig. 18, the details being illustrated in Figs. 19, 20, and 21. A general view of the controller, and especially the upper part, is also shown in Fig. 1. As the handle $c$ is depressed or elevated it raises or lowers the stem $i$. In its downward motion from the central position this stem or the projection shown at $i'$ in Figs. 19 and 21 serves to depress either one or the other of the two levers $g$ $g'$, which serve to rotate in opposite directions the stem or rod $n'$. In elevating the handle any suitable projection from the rod $i$, as $i^2$, Fig. 18, serves to apply the brake by means of the rod $o$ either by pulling, Figs. 19, 20, and 21, or by rotating, Fig. 18, as has been described. A treadle $i^3$ or other actuating device serves the double purpose of operating a lock for the stem $i$, preventing its downward movement. The latch of this lock is indicated at $i^4$ thrust forward by the spring $i^5$ against the stem of the treadle, by the insertion of which against the bevel-surface seen near the letter $i^3$ the latch is withdrawn from the horizontal part of the projection $i'$ of the rod $i$ and its free movement insured, whereas if the stem of the treadle $i^3$ be removed the spring $i^5$ forces the latch $i^4$ to the left in Fig. 20 under the horizontal projection $i'$, securely locking the stem $i$ against the downward movement, but not necessarily preventing an upward movement, although this upward movement may be locked against, if desired. The other function performed by the treadle $i^3$ is the transfer of the rod $i$ or its projection $i'$ forward and backward, so as to bring it respectively in operative connection with the levers $g$ $g'$. This is accomplished through the medium of the bell-crank $i^6$ against the spring $i^7$ working the link $i^8$ and the inclosed rod $i$ backward and forward, as will be readily understood, the spring operating it in one direction and the treadle $i^3$, acting through the extension-pin $i^9$, serving to actuate it in the other direction. The rod $o$ of the brake-lever is operated by a similar bell-crank (indicated at $i^{10}$ and pivoted at $i^{11}$,) the roller $i^{12}$ operating upon the projection or its equivalent $i''$. (See Fig. 18.) The lever $g'$ is connected with the lever $g$ by a link $g''$, and a centralizing-spring $g^3$ serves to return either of the levers $g$ or $g'$ as they are depressed. The handle $c$, being pivoted at $c^3$, is guided at $c^7$ in such a manner that the controller-tube $E^3$ (shown more clearly in Figs. 19 to 11) may be caused by the handle to rotate or turn in another plane than that in which it is shown to move, in dotted lines in Fig. 1, the tube meanwhile turning in the journal formed by tube $E'$. (Shown also in these figures.) The tube $E^3$ continues downward beyond the controller-box F, and at the bottom is suitably coupled to the guiding-rod $c^5$ by a link $c^4$, by means of which the wheels are swung upon their pivots $d$, and the carriage is thereby not only guided but tilted to one side or the other, as will readily be understood from the specification. At the same time by operation of the handle in another plane not only is the power applied to the driving wheel or wheels, but the speed may be increased and decreased or the motive power may be applied in either forward or backward direction, or the brake of the vehicle may be applied or the supply of the power element to the motor be cut off, or its speed controlled by any of the well-known methods—for instance, through the lever $n^4$ and spring $n^5$, as heretofore pointed out.

A form of the automatic mechanism is shown in Fig. 4 and may be described as follows: A swinging lever $s^{10}$ is suitably pivoted and coöperates with the projection $s^9$ of the valve $s^7$, so that when the projection is brought downward to the horizontal position the valve $s^7$ is forced to its seat and made to close. The movement of the lever $s^{10}$ may be caused in any suitable manner; but the preferred action is through the gravity of the ball $t$, which is released from the basket or receptacle $t'$ by a jolt, jar, sudden arresting of the motion of the vehicle, or an excessive tipping action of the vehicle. From any of these causes or a combination of them the ball t rolls out of the receptacle t', and a chain t'' serves to actuate the lever s¹⁰, cutting off the fuel-supply as described. This fuel-supply may constitute the main fuel-supply of the motor or otherwise, and the action of the ball or other device t may serve directly or indirectly to actuate the fuel-valve and may at the same time actuate the air-supply valve, as clearly shown in the figure, the two valves s⁴ and s⁷ being coupled in this figure for simultaneous action.

The use and operation of the devices described have been carefully pointed out from time to time as the description has progressed and will need no further elaboration at this point in the specification, as the operation of the vehicle and vehicle-power as a whole will not only be thoroughly understood, but the detailed operation of the various features selected to illustrate one form of their application will also be readily seen from the foregoing description. Various alternate forms of the devices and constructions have been pointed out; but many others not described will readily occur to those versed in the art to which this application pertains, and the invention contemplates and covers the use of such varied forms and substitute details of construction. The operation also of many of the parts may be reversed and the operated part may become the operator, and vice versa, without departing from the spirit of the invention, and although the various features shown herein are intended to be used in connection with one another, yet it is obvious that some may be used without the others, and the invention extends to such use.

What I claim as new, and desire to secure by Letters Patent, is—

1. In a vehicle-power, a power-driven vehicle-wheel, a device for varying the speed of the wheel, a brake for the vehicle, a vertically-moving controlling-handle, having a predetermined position of rest and a connection therefrom to the speed-varying device, when the said handle is to one side of the position of rest and to the brake, when to the other side of the said position.

2. In a vehicle-power, a power-driven vehicle-wheel, a device for varying the speed of the wheel, a brake for the vehicle, a vertically-moving controlling-handle, having a predetermined position of rest and a connection therefrom to the speed-varying device when the said handle is below the position of rest and to the brake when above the said position.

3. In a vehicle-power, a power-driven vehicle-wheel, a device for varying the speed of the wheel, a brake and steering-gear for the vehicle, a vertically-moving controlling-handle, having a predetermined position of rest, a connection therefrom to the speed-varying device when the said handle is to one side of the position of rest and to the brake, when to the other side of the said position and a connection from the handle to the steering-gear.

4. In a vehicle-power, a power-driven vehicle-wheel, a device for varying the speed of the wheel, a brake for the vehicle, a vertically-moving controlling-handle, having a predetermined position of rest and a connection therefrom to the speed-varying device, when the said handle is to one side of the position of rest and to the brake, when to the other side of the said position, in combination with means for detaching or removing the said controlling-handle.

5. In a vehicle-power, a power-driven vehicle-wheel, a device for varying the speed of the wheel, a brake for the vehicle, a vertically-moving controlling-handle, having a predetermined position of rest, a connection therefrom to the speed-varying device, when the said handle is to one side of the position of rest and to the brake, when to the other side of the said position and a locking device for the handle, whereby the same is rendered inactive.

6. In a vehicle-power, a power-driven vehicle-wheel, a speed-varying device for the wheel, a reversing mechanism, a controller and handle, a connection from the handle to the speed-varying device, a separate actuating means, for actuating the reversing mechanism and a locking device for rendering the handle inactive, connected with a separate actuating means.

7. In a vehicle-power, a power-driven vehicle-wheel, a speed-varying device for the wheel, a reversing mechanism, a controller and handle, a connection from the handle to the speed-varying device, a separate actuating means for actuating the reversing mechanism and means connected with the controller-handle, for holding the said separate actuating means out of action.

8. In a vehicle-power, a motor, a vehicle-wheel, a detachable driving-gear between them, a propelling medium for the motor, a duct for the medium connected to the motor, a valve in the duct and a connection between the valve and the detachable gear.

9. In a vehicle-power, a motor, a vehicle-wheel, a detachable driving-gear between them, a controller for the gear, a propelling medium for the motor, a duct for the medium connected to the motor, a valve in the duct and a connection between the valve and the controller.

10. In a vehicle-power, a power-transmitting gear consisting of a revolving disk and a coöperating friction-wheel, a controller, means for varying the pressure between the wheel and disk, and connection from the controller to both the said means and the wheel.

11. In a vehicle-power, a power-transmitting gear consisting of a revolving disk and a coöperating friction-wheel, a controller-handle for changing the relative position of the wheel and disk by moving the handle farther and farther from a certain predetermined position in its travel, a separate mechanism as a brake upon the vehicle and a connection therefrom to the handle and adapted to be operated when the said handle is upon the other side of the said predetermined position in its travel.

12. In a vehicle-power, a motor, a vehicle-wheel, a variable detachable driving-gear between them, a controller-handle operating in opposite directions from an intermediate point in its travel, connections from the handle to the detachable driving-gear such that the power is raised while the handle is in one position and detached when in the other position, or a position to the other side of the said predetermined point, and an independent mechanism as a brake for the vehicle and operating connection from the same to the handle when in the last-named position.

13. In a vehicle, a manually-actuated steering-gear, in combination with means actuated by such steering-gear, for depressing one side of the vehicle at the will of the operator.

14. In a vehicle, a manually-actuated steering-gear, in combination with means actuated by such steering-gear for raising one side of the vehicle, at the will of the operator.

15. In a vehicle, a manually-actuated steering-gear, in combination with means actuated by such steering-gear for depressing one side and raising the other side of the vehicle, at the will of the operator.

16. In a vehicle-power, a motor, a vehicle-wheel, a power connection from the motor to the wheel, a controller, a handle therefor, a separate actuating means for disconnecting the vehicle-wheel from the motor when the said separate means is removed from its working position.

17. In a vehicle, a steering-gear in combination with means for actuating said gear, a swiveling headlight upon the vehicle and operating connection between the means and the headlight.

18. In a power-gearing, a revolving disk, a coöperating wheel for the disk, a separate facing for the disk, in combination with an underlying elastic medium for the facing.

19. In a vehicle, two independent driving-wheels, means for varying the working diameter of the wheels, a motor, a power-driving connection allowing of independence of rotation of the wheels for coupling the motor to such wheels, in combination with an extra brake-wheel and brake therefor independently mounted and independently rotatable from one of the wheels for braking the wheels.

20. In a vehicle, two independent driving-wheels, means for varying the working diameter of the wheels, a motor, a power-driving connection allowing of independence of rotation of the wheels for coupling the motor to such wheels, in combination with an extra brake and brake-wheel therefor independently mounted and independently rotatable from either of the wheels for braking the wheels.

21. In a vehicle-power, two driving-wheels, a portion of an axle attached to each wheel, means for bringing the axis of the two portions coincident, forming thereby a compound axle, another axle for the vehicle, a motor sleeved on the compound axle, a power connection from the motor to the compound axle and a resilient support between the motor and the other axle.

22. In a vehicle-power, a compound axle, consisting of two independent rotating parts, a driving-wheel upon each part, a motor sleeved upon the compound axle and means connected with the motor for driving each of the said parts, another axle upon the vehicle and a resilient support from the motor to the other axle.

23. In a vehicle-power, an axle supporting a gear, two journals upon the axle to one side of the gear, a motor supported by the journals, and an extension for supporting the motor reaching to the front axle.

24. In a vehicle-power, an axle supporting a gear, two journals upon the axle to one side of the gear, a motor supported by the journals, and gearing mounted integral with the motor driving the gear upon the axle.

25. In a vehicle-power, an axle supporting a gear, two journals upon the axle to one side of the gear, a motor supported by the journals, and an additional journal on the axle.

26. In a vehicle-power, a motor, gearing driven by the motor, a suitable support and a tubular frame connecting the motor, gearing and the support.

27. In a vehicle-power, a motor, a fuel-supply therefor, in combination with means for cutting off the fuel-supply whenever the vehicle is out of the vertical or stopped suddenly.

28. In a vehicle-power, a motor, an igniter for the motor, in combination with means for rendering the igniter inoperative when the vehicle is out of the vertical or stopped suddenly.

29. In a power-vehicle, a vehicle-body, a seat, a dasher, a floor-space separating them, lower than either, a motor located in the rear of the space, an air-duct leading to the motor, extending forward downwardly under the space to the dasher; then up the dasher to a point upon its forward face, and an opening for the duct, located at this point.

30. In a power-vehicle, a vehicle-body, a seat, a dasher, a floor-space separating them, lower than the seat, a motor located in the rear of the space, an air-duct leading to the motor, passing forward downwardly under the space to the dasher; then to a point upon the forward face of the dasher, an opening for the duct located at this point and a power-blast or blower connected to the duct and an additional connection from the blower extending to the motor.

31. In a vehicle-power, a motor, an igniter for the motor, requiring fuel, in combination with means for cutting off the fuel-supply whenever the vehicle is out of the vertical or stopped suddenly.

32. In a vehicle-power, a motor deriving its power from fire or heat, in combination with means for automatically extinguishing the fire or heat when the vehicle is out of the vertical or is stopped suddenly.

33. In a vehicle-power, a motor, means for forcing or causing an air-blast through certain ducts within the motor by the forward movement of the vehicle aided by a power-blast.

34. In a vehicle, a wheel, a swivel for the wheel, at a point near the wheel, at one side, the said swivel having an axis lying oblique to the plane of the wheel, the angle being such as to intersect the said plane of the wheel at a point well up from the bottom of the wheel.

35. In a vehicle, a wheel, a swivel for the wheel at a point near the said wheel, on one side, the said swivel having an axis lying oblique to the plane of the wheel, the angle being such as to intersect the plane of the wheel on the level, of interception by the wheel, of an obstacle of importance.

36. In a vehicle-power, an axle, a reciprocating motor sleeved upon the axle and resiliently supported at another point to the running-gear of the vehicle, in combination with two oppositely-moving and equally-weighted pistons for the motor.

37. In a power-vehicle, power-gearing, means for the support of the gearing, a vehicle-body, a separate seat and end for the body, and means for folding the separate parts with reference to the body.

38. In a power-vehicle, power-gearing, means for the support of the gearing, a vehicle-body, two seats and an end for the body separate from the body, and means for folding both the seats and end with reference to the body.

39. In a power-vehicle, power-gearing, means for the support of the gearing, a vehicle-body, a separate part including the top and end of such body, and a flexible joint located on the opposite side of the gearing from the said end.

40. In a power, a revolving part having a peripheral face, a gear-wheel mounted within such part, the axis of said gear lying radial to the revolving part, in a plane outside the said face.

41. In a power, a friction-disk, a friction-wheel, a shaft for the disk, and a moving-ball thrust-bearing for the disk.

42. In a power, a friction-disk, a friction-wheel, a shaft for the disk, and moving-ball axle-bearing and thrust-bearings for the disk.

43. In a power, a friction-disk, a friction-wheel, a shaft for the disk, a moving sleeve for the shaft, and ball-bearings between the shaft and the sleeve.

44. In a power, a rotating shaft having a conical portion, a crank for the shaft provided with a conical perforation, and detachable coöperating driving projections from both the shaft and crank.

45. In a power-vehicle, a gear on an axle, a driving-pinion for the gear, an intermediate gear between them, and a slot concentric with the axle for securing the axis or gudgeon of the intermediate gear.

46. In a power-vehicle, a gear on an axle, a shaft, a detachable pinion on the shaft for driving the gear, an intermediate gear between them, and a slot concentric with the axle for preserving the axis or gudgeon of the said intermediate gear.

47. In a power-vehicle, a directable headlight, a mechanism for altering the speed of the vehicle, in combination with a handle controlling the direction of the said headlight.

48. In a power-vehicle, a means for changing the level of the vehicle, a means for varying the speed of the vehicle, and a controller-handle for the first-named means whereby an occupant of the vehicle may change the level of the vehicle at will.

49. In a power-gearing, a revolving disk, a plurality of coöperating friction-wheels for the disk, a shaft for the wheels, in combination with an elastic medium between the shaft and the disk.

50. In a vehicle-power, a power-driven vehicle-wheel, a mechanism for varying the speed of the wheel, a brake or stopping device and steering-gear for the vehicle; a controlling and guiding handle, swinging in a horizontal plane for guiding, and also having a to-and-fro movement in another plane, a predetermined position of rest in such last-named movement, a connection from the handle to the speed-varying device, for operating it when to one side of the position of rest and to the stopping device, for operating it, when to the other side of the said position and a connection from the handle to the steering-gear.

ELMER A. SPERRY.

Witnesses:
W. J. POSSONS,
M. NIELSON.